L. CLARK.
MILK-COOLER.

No. 172,389. Patented Jan. 18, 1876.

WITNESSES
Franck L. Durand
C. L. Evert.

INVENTOR
Langdon Clark
By Alexander Mason
Attorneys

UNITED STATES PATENT OFFICE.

LANGDON CLARK, OF CRARY'S MILLS, NEW YORK.

IMPROVEMENT IN MILK-COOLERS.

Specification forming part of Letters Patent No. 172,389, dated January 18, 1876; application filed December 14, 1875.

*To all whom it may concern:*

Be it known that I, LANGDON CLARK, of Crary's Mills, in the county of St. Lawrence and in the State of New York, have invented certain new and useful Improvements in Milk-Coolers; and do hereby declare that the following is a full, clear, and exact description thereof, reference being had to the accompanying drawings, and to the letters of reference marked thereon, making a part of this specification.

The nature of my invention consists in the construction and arrangement of a milk pan and regulator, having for its object to more completely regulate and control the temperature of the milk, as will be hereinafter more fully set forth.

In order to enable others skilled in the art to which my invention appertains to make and use the same, I will now proceed to describe its construction and operation, referring to the annexed drawing, in which—

Figure 1:
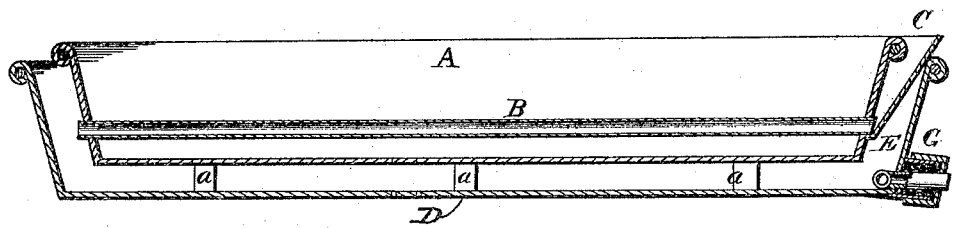
Figure 2:
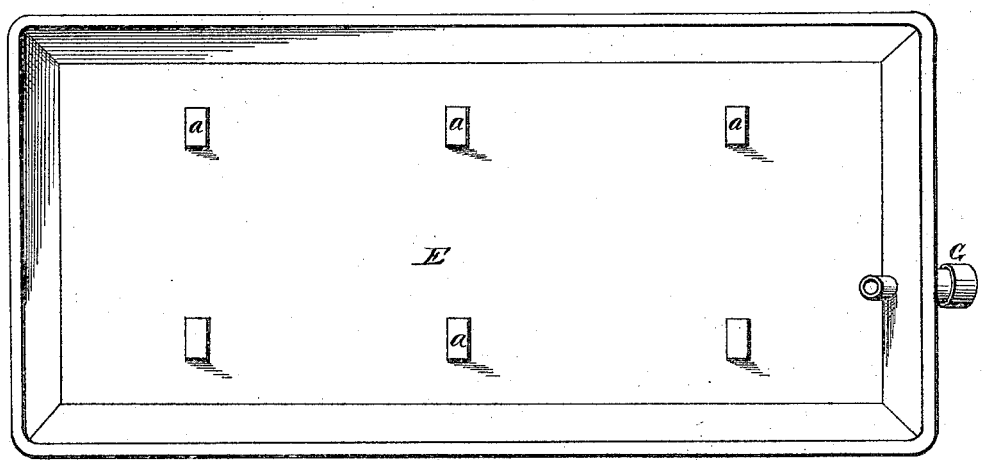
Figure 3:
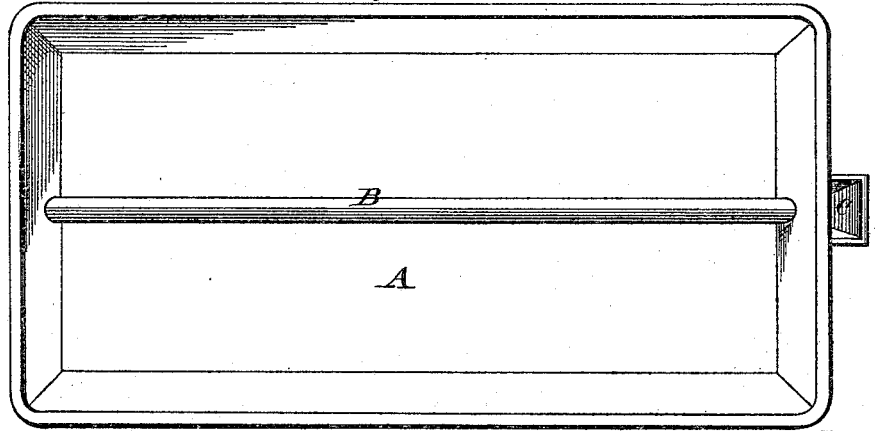

Figure 1 is a longitudinal section of a milk-pan and exterior vat, embodying my invention. Fig. 2 is a plan view of the exterior vat, and Fig. 3 is a plan view of the milk-pan.

A represents the milk-pan, of any suitable form and size, and provided at or near the center with a pipe, B, running longitudinally through the same. This pipe is at one end provided with a funnel-shaped enlargement, C, through which water is admitted. The milk-pan A is placed within a vat, D, upon any suitable supports, $a$ $a$, that will leave a space between the bottom of the pan and the bottom of the vat. At one end of the vat D, close to the bottom, is an elbow-pipe, E, passing out through a stuffing-box, G, in the end of the vat. The inner arm of this pipe may be raised to any desired height from a horizontal to a vertical position, and thereby regulate the height of the water in the vat. The water—whether hot or cold, according to the season of the year—being allowed to flow into the funnel, passes through the pipe B, and out at the other end of said pipe into the vat D, where it surrounds the lower portion of the milk-pan A to the height of the top of the regulator E.

It will thus be seen that the water passes through the central portion of the milk, and at the same time surrounds the same, as the water is intended to stand in the vat at the same height as the milk. By these means an upward current of vapor from the milk is created, which takes off the animal heat, and thereby improves the quality of butter manufactured from the milk. The water is taken in and the milk may be discharged at the same side of the pan to avoid placing outside pipes in the central part of the milk-room.

Having thus fully described my invention, what I claim as new, and desire to secure by Letters Patent, is—

The combination of the milk-pan A, the adjustable pipe B, having couplings and packings, and passing longitudinally through the center thereof, and provided at one end with the funnel-shaped mouth C, the exterior vat D, and adjustable regulator E, all substantially as and for the purposes herein set forth.

In testimony that I claim the foregoing I have hereunto set my hand and seal this 2d day of December, 1875.

LANGDON CLARK. [L. S.]

Witnesses:
 JNO. MILLER,
 N. D. ELLSWORTH.